UNITED STATES PATENT OFFICE.

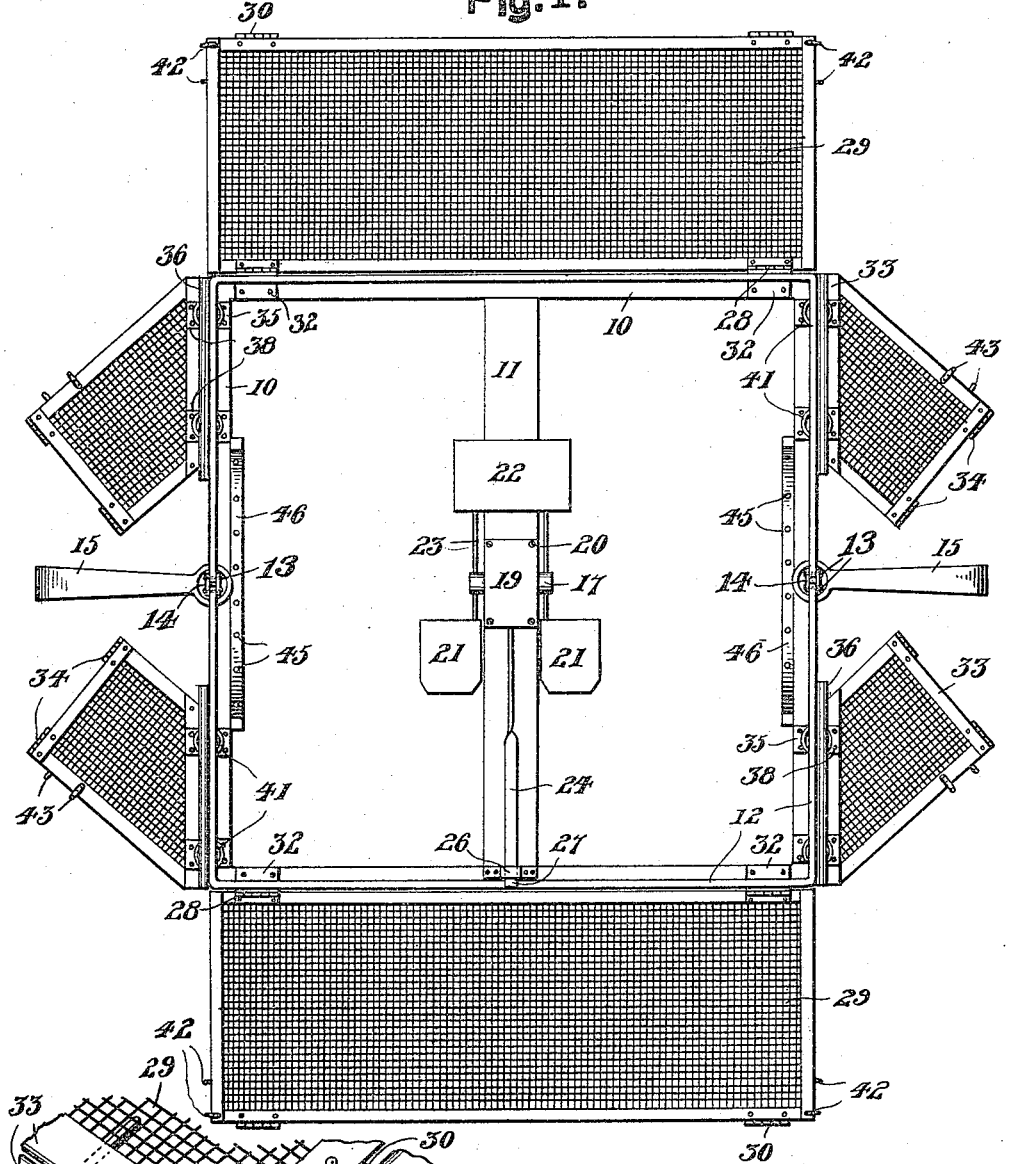

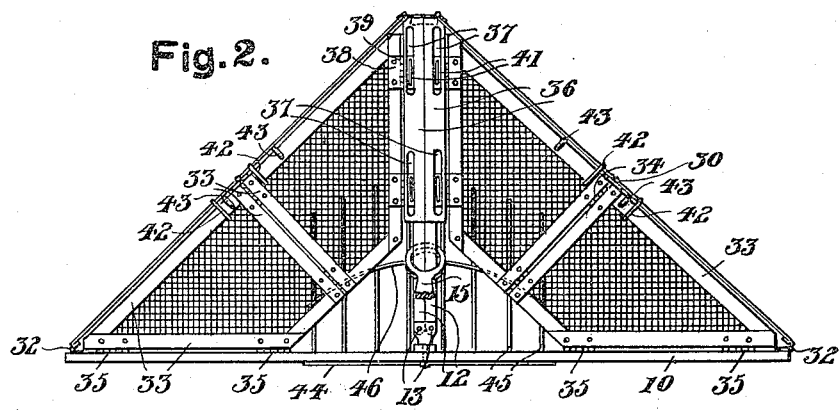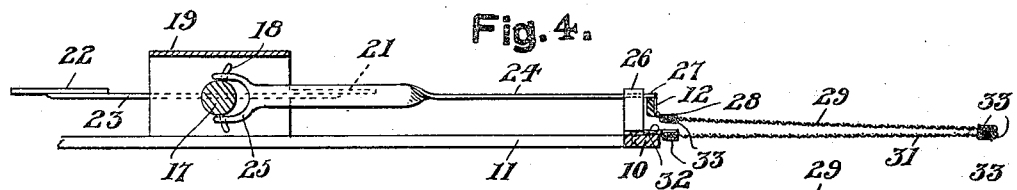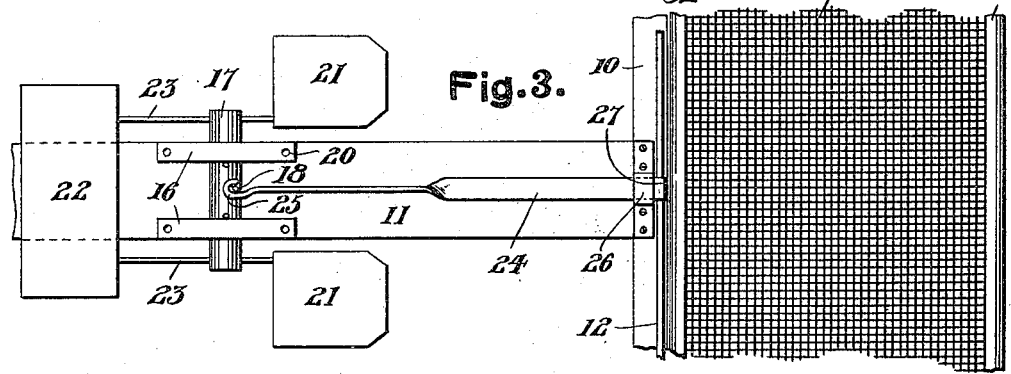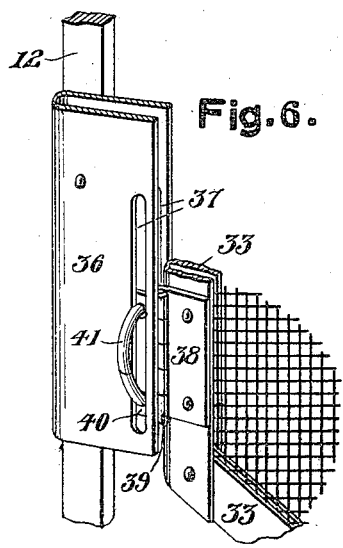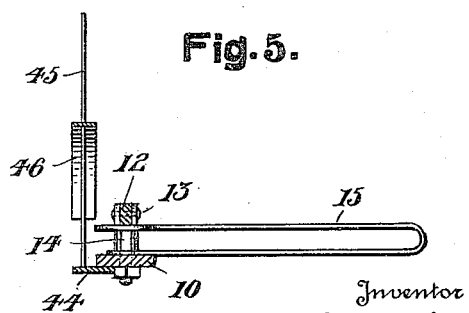

ANDY KORCOK, OF AKRON, OHIO.

ANIMAL-TRAP.

1,168,316.

Specification of Letters Patent.  Patented Jan. 18, 1916.

Application filed July 30, 1915. Serial No. 42,807.

*To all whom it may concern:*

Be it known that I, ANDY KORCOK, a citizen of the United States, residing at Akron, in the county of Summit and State of Ohio, have invented certain new and useful Improvements in Animal-Traps, of which the following is a specification.

This invention relates to certain new and useful improvements in animal traps.

An object of the invention is to provide an animal trap including a screened cage section completely open in set position and which, when closed, is adapted to house an animal without injury to the same.

A further object of the invention is to provide an animal trap in which the animals are caught in live condition and in which the tripping mechanism is positioned completely within the trap so that operation of the trap is necessary from a point within the same.

Further detailed objects of the invention will appear as the same is described more in detail, and particular attention is called to the construction of the screened cover section and to the hinged connections between the folding parts, the invention further consisting in the novel construction and combination of parts to be hereinafter more fully described and then claimed.

In the drawings forming a part of this application and in which like designating characters refer to corresponding parts throughout the several views: Figure 1 is a top plan view of a trap built in accordance with the present invention, the same being shown in set position. Fig. 2 is an end elevational view of the same in closed position. Fig. 3 is a top plan view of a portion of the same with the bait plate removed and showing the tripping mechanism. Fig. 4 is a longitudinal sectional view of a portion of the same showing the tripping mechanism. Fig. 5 is a detailed sectional view showing one of the closing springs. Fig. 6 is a detail perspective view of one of the hinged joints between the central end rail of one section and the swinging end screen carried thereby, and, Fig. 7 is a detail perspective view of a portion of the cover screen showing the joint at the end of the top and one end of the screen sections.

Briefly described, the present invention aims to provide an animal trap in which the animals within the trap are retained in a live condition, the trap including a rectangular frame that may be either open or closed at the bottom, as may be required, while two identically formed hinged screen cover sections are carried by the frame. Operating springs are associated with the supporting frames for the screen sections and the tripping mechanism positioned within the trap is adapted to engage the supporting frame at one side of the trap and control the operation of both frames. In open or set position, the folding screen sections are adapted to lie juxtaposed and in substantially horizontal position while guiding pins are adapted to hold the screen sections in assembled position when the trap is operated.

Referring more in detail to the accompanying drawings, the reference numeral 10 designates the main supporting frame section that is preferably constructed of metal while a transversely positioned trip mechanism supporting bar 11 is arranged between two of the end bars of the frame as more clearly shown in Fig. 1. As shown, the main supporting frame consists of side and end bars with a completely open bottom but the same may be formed of a single plate to provide a closed bottom wall as occasion may require.

A pair of identically formed cover sections are swingingly attached to the side rails of the base frame and include U-shaped metallic frames 12 hinged at their meeting ends as at 13 in the upstanding stud 14 carried by the side base rails 10. The spring members for operating the swinging frame sections for moving the same to closed position include the U-shaped spring members 15, more clearly shown in Fig. 5, having a pair of alined openings in the ends thereof adapted to be received on said stud while the U-shaped frames 12 when moved to horizontal position will cause the spring to lie under compression as indicated, the said frames being retained in such position by the tripping mechanism to be presently described.

A pair of spaced blocks 16 are positioned centrally of the bar 11 and are fixed thereto, while a stub shaft 17 carrying oppositely-directed actuating pins 18 is journaled transversely of the bar 11 and in the blocks 16, a bait plate 19 being positioned above the blocks 16 and secured thereto as by fastening members 20, this bait plate completely hiding the pins carried by the stub shaft 17 and their mechanism. The stub shaft 17 is adapted to be oscillated by the trip platforms 21 and 22, rods 23 passing through the ends of the shaft 17 spaced outwardly of the blocks 16 and carrying at their ends the trip platforms 21 and 22. A trip rod 24 has the inner end thereof bifurcated to provide a pair of hooked leg extensions 25 adapted to engage the oppositely-projecting pins 18 on the stub shaft, so that when the stub shaft is oscillated, the said trip rod 24 will be shifted longitudinally. A keeper 26 is carried by one of the end rails of the base frame 10 and the projecting end 27 of the rod 24 is adapted to normally lie beneath the said keeper 26 and be positioned above the U-shaped frame rail 12 to hold the same in open set position as shown in Fig. 4 against the tension of the spring 15.

The U-shaped frame sections 12 have hingedly connected thereto at the upper side and ends, hinged screen members as indicated, which when the trap is in open set position will assume a substantially horizontal position adjacent the support, but which when the trap is sprung to closed position, will move to form a complete closure for the trap and retain the animal therein. The description of the screen members for one frame section will be sufficient to gain a complete understanding of each section. The horizontal leg of the frame 12 has hingedly connected thereto as at 28, a screen section 29 which in turn is hinged as at 30 to a second screen section 31, the lower rail of the screen section 31 being hingedly connected as at 32 to the end rail of the base supporting frame 10. As shown in detail in Fig. 7, each of the screen sections includes a wire netting bound at its edges in the channel irons 33 to protect the same and form a substantial bearing for the hinged joints referred to.

The end screen sections include a pair of members hinged at their inner ends as at 34, the lower end of the lower member being hinged as at 35 to the side rail of the base supporting frame while the upper edge of the upper screen member has a special form of hinge connection with the vertical leg of the U-shaped supporting frame 12, this construction being more clearly shown in Fig. 6. Each of the side vertical legs of the U-shaped supporting frame 12 carries a channel-iron 36, the free edges of which are longitudinally slotted as at 37 as indicated in Fig. 2. One of the butts 38 of the hinge 39 is connected to the channel-iron 33 of the upper end screen section while the other butt 40 extends between the legs of the channel member 36 and is retained therein by a ring 41 passing through openings therein and extending laterally of the slots 37. In order to hold the screen sections in correct assembled position, I have provided retaining angle pins more clearly shown in Fig. 7, the pins 42 being secured to the upper screen members 29 and 31 to overlap the end screen members while the pins 43 are secured to the end screen members and are adapted to underlie the upper screen members.

A picket fence is positioned at opposite sides of the base supporting frame adjacent the hinged connection of the U-shaped supporting frames and includes inwardly-directed flange members 44 upon which the vertically-arranged pickets 45 are positioned, a segment band 46 being mounted on the pickets to hold the same in spaced vertical positions.

From the above detailed description of the invention, it is believed that the operation thereof will be readily apparent, it being noted that when the springs 15 are compressed or moved to the position shown in Fig. 5, the frame sections 12 will be permitted to collapse or fall to the horizontal position as shown in Fig. 1, and at which time the trip platforms 21 and 22 may be shifted to cause the trip rod 24 to be retracted so that the screen supporting frame will pass beneath the projecting end 27 thereof. When this is accomplished, the trip platforms are moved to their set position with the projecting end 27 of the trip rod positioned above the frame member 12. In this position, the top screen sections 29 and 31 are folded upon themselves as are also the end screen sections, it being noted that the hinges 39 move toward the outer ends of the slots 37 when the end screen sections are folded as indicated. When the shaft 17 is moved in either direction, the pins 18 carried thereby will be caused to selectively engage the hooked furcations 25 of the trip shaft 24, thereby to retract the projecting end 27 from the U-shaped supporting frame rail. This being accomplished, the springs 15 will assert their force and cause the U-shaped supporting frames to be elevated to the position shown in Fig. 2, causing the screen sections to form a complete housing in conjunction with the picket fence for the trap.

While the form of the invention herein shown and described is what is believed to be the preferred embodiment thereof, it is nevertheless to be understood that various forms, modifications and arrangements of the parts may be made without departing from the spirit and scope of the invention as set forth in the appended claims.

What I claim as new is:—

1. An animal trap including a rectangular base supporting frame, U-shaped frames swingingly attached thereto, hinged screen sections forming cover and end walls carried by the U-shaped frame sections, picket fences carried by the base supporting frame at each side thereof, a transversely-positioned bar carried by the supporting frame, trip mechanism supported on said bar including a journaled stub shaft, oppositely-extending pins carried thereby, platforms positioned at opposite sides of said shaft associated therewith, a trip rod operated by said pins and adapted to be positioned in engagement with one of said U-shaped frames, and coöperating retaining pins carried by the adjacent screen sections.

2. An animal trap including a base supporting frame, identically formed cover sections hingedly connected to said frame, a stub shaft supported by said base frame, oppositely directed pins carried by said stub shaft, tilting platforms associated with said stub shaft, a trip rod bifurcated at one end to engage each of said pins, the opposite end of said trip rod adapted to engage the cover sections to hold the same in open set position, and a spring associated with the cover sections to cause the same to assume a closed position when the trip rod is released.

In testimony whereof I affix my signature.

ANDY KORCOK.

Copies of this patent may be obtained for five cents each, by addressing the "Commissioner of Patents, Washington, D. C."